Oct. 31, 1961     R. E. WOODWORTH     3,006,695
ANTISKID DEVICE
Filed Oct. 15, 1957     2 Sheets-Sheet 2
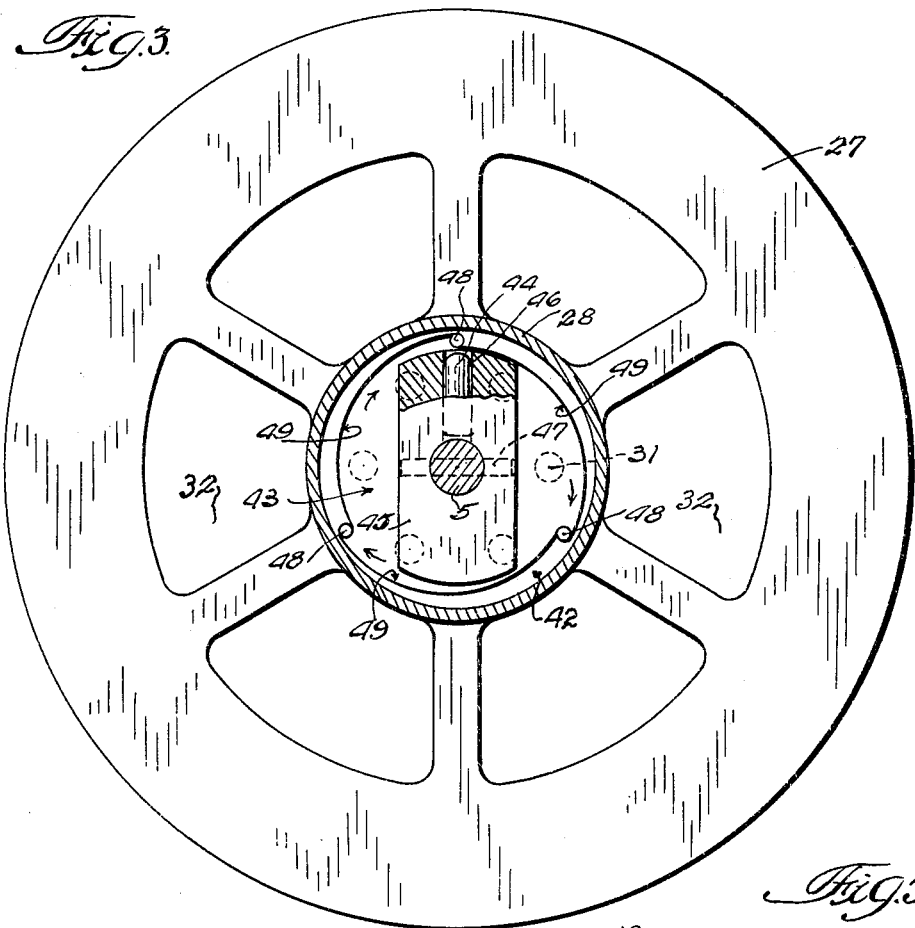
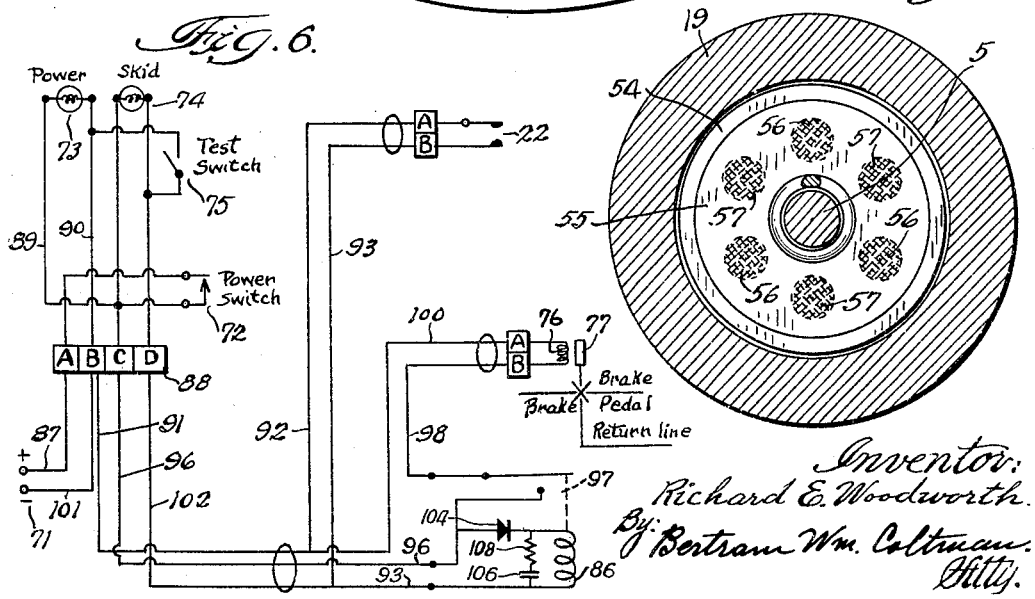
Inventor:
Richard E. Woodworth.
By Bertram Wm. Coltman.
Atty.

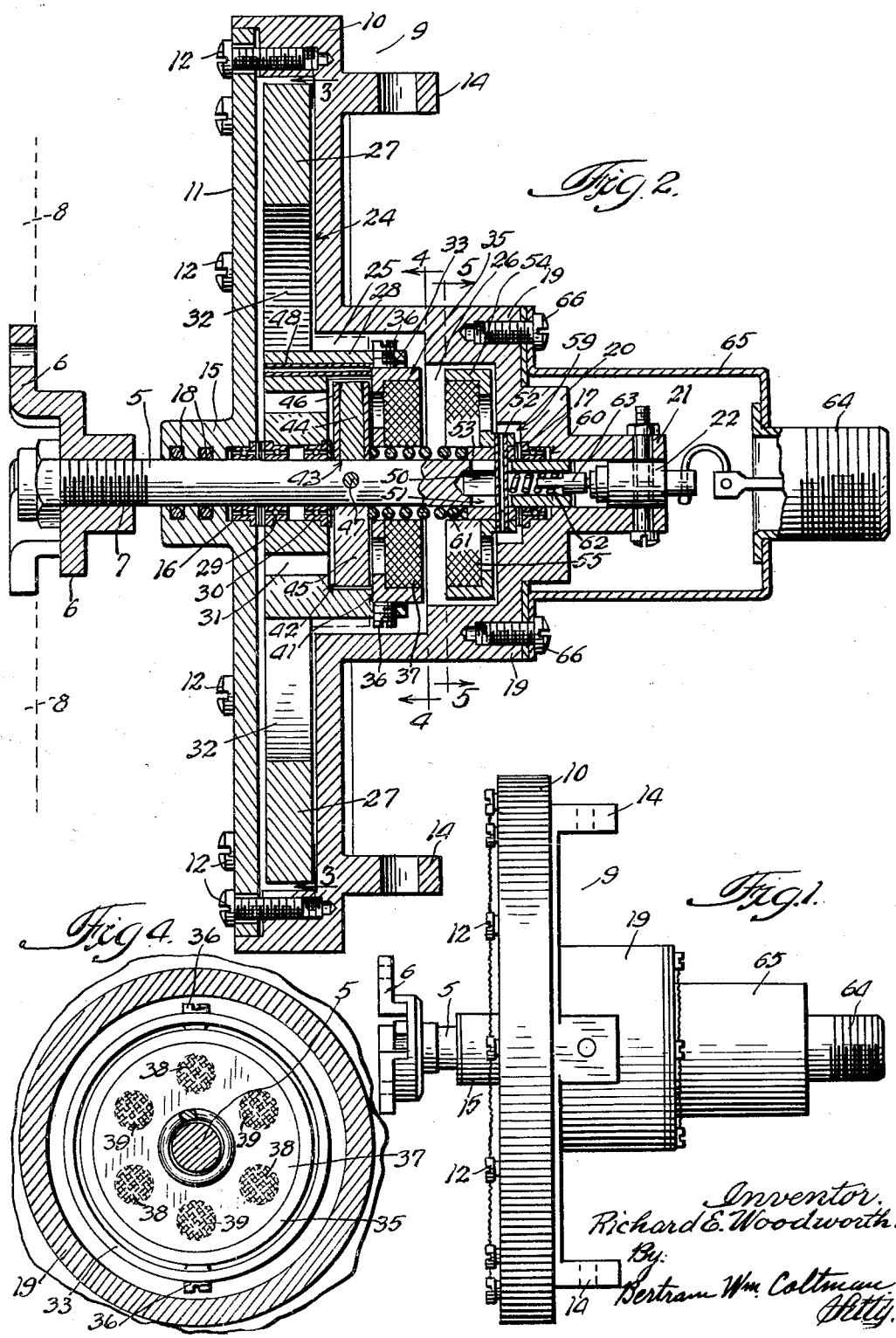

United States Patent Office

3,006,695
Patented Oct. 31, 1961

3,006,695
ANTISKID DEVICE

Richard E. Woodworth, Wheaton, Ill., assignor to Cook Electric Company, Chicago, Ill., a corporation of Delaware
Filed Oct. 15, 1957, Ser. No. 690,342
8 Claims. (Cl. 303—24)

This invention relates to an antiskid device in an automatic brake control mechanism and more particularly to a simple and improved form of antiskid device forming a part of the brake control mechanism, being particularly applicable to the wheels of aircraft to prevent skidding and to reapply brake pressure when the skidding is removed.

The invention is directed broadly to an improved form of antiskid control which is exceptionally sensitive and effective in its operation under substantially all known aircraft landing conditions.

Automatic control of braking of the wheels of aircraft during landing presents a difficult problem. It is important that the wheels do not skid or lock upon landing when the brake pressure is applied. Skidding and wheel-locking have been the cause of many aircraft accidents and have compelled frequent replacement of tires, landing gears and brake mechanism. Incipient skidding should also be eliminated. Although skidding is an important problem in aircraft of the piston power type, it has become even more vital in the field of jet aircraft due to the faster landing speeds and the absence of reversible propellers. It is difficult for a pilot to bring a fast-moving airplane to a controlled stop on hazardous runways or on short runways with close landing ramps. Although antiskid devices have been heretofore proposed, they rely largely upon electrical systems that are cumbersome, occupy excessive space and are not reliable.

In copending application, Serial No. 655,939, filed April 17, 1957, now Patent No. 2,947,579, I have disclosed an improved system of automatically controlling the brake mechanism to prevent skidding and to reapply the brake pressure when the skidding is removed. In this system, I preferably employ a closed hydraulic circuit, a rotary pump and opposed pressure-sensitive units, one of which is responsive to the pressure developed by the pump and the other of which is responsive to a reduced rate of pressure. The arrangement provides for controlling the operation of the brake releasing and applying means by the pressure differential between the units. While the system is extremely sensitive to deceleration caused by skidding or wheel-locking because the hydraulic circuit is directly responsive to the changes in the rate of rotation of the aircraft wheels, the constant demand for greater reliability in the braking of modern airplanes, aggravated by increased runway problems, has emphasized the need for a single means of sensing a short incipient skid and a long skid and being able to correct both types of skids by this single means.

Accordingly, it is an object of the present invention to combine in a single simple unit means for sensing a short incipient skid and a long skid and for correcting both types of skids in an automatic brake control mechanism particularly adaptable to aircraft.

A further object of the invention is to provide a simple form of antiskid device capable of meeting the constant demand for greater reliability in performance of automatic brake control mechanism for aircraft.

A still further object of the invention is to provide a simple form of antiskid device for aircraft that is of minimum weight and size and will require minimum maintenance.

The antiskid device embodying the present invention preferably employs a speed retention wheel or inertial mass, mounted on a shaft driven by a wheel of the vehicle and means to drive the speed retention wheel by this shaft as the latter is brought to landing speed upon contact of the aircraft wheels with the runway. However, when upon excessive braking, skidding or wheel-locking occur, the shaft rotation decelerates but the speed retention wheel overruns the shaft and continues at its rotational speed. The difference in rate of rotation between shaft and speed retention wheel causes relative movement between multipolarized magnetic units so that a consequent separation of the magnetic units will take place when like poles thereof pass over each other. The separating movement of these units will promptly actuate means to reduce the brake pressure, thereby ending the skid. One of the magnetic units is preferably carried by the speed retention wheel while the other unit is keyed to the shaft but axially movable therealong so that the relative movement of these units resulting from alignment of like or opposite poles thereof as they pass over each other may be effectively used to operate the brake releasing and applying means.

The invention also extends specifically to the novel relation of the speed retention wheel with respect to the magnetic units and the shaft driven by the wheel of the vehicle which will drive this speed retention wheel in the absence of skidding or wheel-locking but which will permit instant overrun of the speed retention wheel when skidding or wheel-locking occurs. As explained above instant overrun brings about relative movement between magnetic units so as to cause like poles to pass over each other with a consequent separation between the units and the actuation of the brake releasing and applying mechanism. The speed retention wheel will keep the magnetic units apart and hold the brake releasing and applying means actuated until the wheels of the airplane are again restored to proper landing speed after overcoming skidding or wheel-locking. In other words, deceleration caused by skidding or wheel-locking will cause the speed retention wheel to keep the magnetic units apart until the airplane wheels again come up to proper speed. I have provided an arrangement preventing slippage between the parts so as to assure complete and effective reliability of the device and instant operation whether there be a short incipient skid or a long skid or wheel-locking.

The device is exceptionally simple and very effective in actual use.

Other objects and advantages of the invention will be apparent from the following detailed description when taken in connection with the accompanying drawings in which:

FIGURE 1 is a side elevation of a device embodying the invention;

FIG. 2 is an enlarged longitudinal section of the device shown in FIG. 1;

FIG. 3 is an enlarged view partly in elevation and partly in section of the speed retention wheel and the indexing dog mechanism, this view being taken along line 3—3 of FIG. 2;

FIG. 4 is a section taken along line 4—4 of FIG. 2;

FIG. 5 is a similar view but taken along line 5—5 of FIG. 2; and

FIG. 6 is a wiring diagram showing the various circuits employed therein.

As disclosed in the drawings, the antiskid device 9 embodying the present invention is preferably mounted upon a shaft 5 having a suitable connection 7 with a mounting plate 6. Mounting plate 6 may be of a design suitable for attachment to a rotatable wheel 8 of the vehicle so that shaft 5 will be driven by this wheel 8.

This antiskid device 9 specifically includes a housing 10 having a cover plate 11 secured thereto by bolts 12 or the like. Housing 10 with cover plate 11 may be secured to the axle structure of the wheel by mounting lugs 14. It will be observed that shaft 5 extends into housing 10 and hub 15 of cover plate 11 and is supported therein by suitable antifriction bearings such as those shown at 16 and 17, there being a suitable seal between this shaft 5 and hub 15 in the form of O rings 18. Housing 10 is reduced by an extension 19 and again by a second extension 20 so that it terminates in a smaller portion 21 to carry a snap switch 22. A closed chamber 24 is provided by housing 10 and cover plate 11. This chamber 24 is reduced at 25 and again at 26 within extension 19.

Mounted within closed chamber 24 and upon shaft 5 is a speed retention wheel 27 having a hub portion 28 that is carried upon shaft 5 by two suitable antifriction bearings 29 and 30. The mass at the hub portion 28 is reduced by a series of openings 31 while further reduction of the mass is secured by larger openings 32 next to the hub portion, this leaving the greatest mass next to the outer rim. Thus wheel 27 is designed to retain its rotational speed when disconnected from shaft 5 as the latter decelerates upon skidding or locking of the wheel 8.

Hub portion 28 is formed with an outwardly projecting sleeve 33 to receive and fixedly carry an indexing magnet carrier 35 by means of a plurality of set screws 36. The internal diameter of sleeve 33 is slightly larger than the outer diameter of carrier 35 so that the amount of clearance between these two parts allows a slight centering adjustment of carrier 35 by means of these set screws 36, the purpose of which will be presently set forth. An indexing magnet 37 is disposed in carrier 35 and is multipolarized at a series of locations as indicated at 38 and 39, the locations 38 being, for example, of a negative polarity and the locations 39 being of a positive polarity. Carrier 35 is seated against a shoulder 41 so that a pocket 42 will be formed between this carrier and the innermost portion of the hub of speed retention wheel 27.

Indexing structure 43 is disposed in pocket 42 (see FIG. 3). It comprises an indexing dog 44, a carrier 45 having a chamber 46 for dog 44 and a pin 47 for locking carrier 45 to shaft 5 so that it will rotate with this shaft 5. As will be observed in FIGS. 2 and 3, a series of indexing pins 48 are disposed at predetermined locations in the ends of tapering camways 49 of hub portion 28. As shaft 5 picks up speed upon landing of the aircraft, dog 44 will be centrifugally moved outwardly from its chamber 46 whereby the tip of this dog 44 will ride one of the camways 49 until it strikes one of the projecting indexing pins 48 at the end of this camway. A driving connection is immediately established between shaft 5 and the speed retention wheel 27 so that the latter wheel 27 will rotate at the same speed as shaft 5. However, when shaft 5 decelerates due to skidding or wheel-locking, dog 44 effectively slides counterclockwise along the surface of camways 49, thereby permitting the speed retention wheel 27 to continue to rotate while shaft 5 slows down or ceases to rotate altogether. Thus, dog 44 no longer is in driving engagement with any of indexing pins 48, and speed retention wheel 27 is effectively disconnected from shaft 5. The purpose of disposing indexing pins 48 at predetermined spaced distances will be presently described.

Shaft 5 is cored at one end to provide a chamber 50 and is slotted at 51 to provide a keyway for a pin 52 that splines a bushing 53 and an actuation magnet carrier 54 to this shaft 51 and provides for axial movement of bushing 53 and carrier 54 along shaft 5. Carrier 54 is adapted to receive and carry an actuation magnet 55 which is also multipolarized at a series of locations as indicated at 56 and 57 (FIG. 5), the locations 56 being, for example, of a positive polarity and the locations 57 being of a negative polarity. This bushing 53 and carrier 54 may be disposed in chamber 26 that is stepped down at 59 and then at 60, the latter receiving the antifriction bearing 17 and the former receiving a short sleeve extension of carrier 54 through which pin 52 keys both the carrier 54 and bushing 53 to shaft 5. Chamber 26 and its reduced portion 59 are of slightly greater depth than carrier 54 to allow axial movement of carrier 54 and the actuation magnet 55 carried thereby. A coiled release spring 61 is disposed about shaft 5, with one of its ends bearing against the indexing dog carrier 45 pinned at 47 to shaft 5 and with the other end bearing against bushing 53, this spring 61 acting to accelerate separation of the magnet units 37 and 55 when like poles pass over each other as the result of shaft 5 decelerating upon skidding or wheel-locking and speed retention wheel 27 being disconnected from shaft 5 to cause relative rotation between the magnet units 37 and 55.

Chamber 50 is provided with an over-travel spring 62 disposed between pin 52 and a switch operating button 63 disposed in the end of chamber 50 to bear against and actuate snap switch 22 connected in and forming a part of the means for releasing and applying the brake mechanism. This switch 22 may be connected through the plug 64 carried by a small casing 65 attached to extension 19 of housing 10 by bolts 66 so as to enclose the projection 21 and switch 22 carried thereby. This structure may be varied, of course, according to the requirements of a particular installation.

The control circuit includes a source of current 71, a power switch 72, a power light 73, a skid light 74, a test switch 75, snap switch 22, a solenoid winding 76 of the three-way brake pedal valve 77 controlling the flow of the brake fluid between the brake pedal and the brake mechanism or the release of fluid to the return line when it is desired to remove the control of the brakes from the brake pedal in the pilot's compartment. As previously stated, the action of the device is instantaneous when a skid or wheel-lock occurs. To prevent the magnetic units 37 and 55 from operating at an excessive rate that might cause the solenoid 76 and valve 77 to operate too fast and the hydraulic system of the brake mechanism to go on and off at such a high rate that vibration will be produced at the landing gear capable of damaging the same, a relay 86, affording a predetermined time delay, may be employed in the circuit of snap switch 22 as illustrated in FIG. 6.

The source of current or power supply 71 comprises supply leads 87 and 101 which are connected to a terminal block 88. The power switch 72 is connected between the lead 87 and the lead 96. It will be seen that the power light 73 is connected between the leads 96 and 101 by means of leads 89 and 90. Thus, the power light 73 will be illuminated whenever the power switch 72 is closed to supply current to the antiskid device.

Starting from the power supply lead 101, a series circuit may be traced to the power lead 96 through a lead 91, a lead 92, the control switch 22, operable by the skid detector, a lead 93, the relay coil 86, and a rectifier 104. It will be understood that the rectifier 104 tends to prevent arcing at the switch 22 when the switch is opened. A capacitor 106 and a resistor 108 are connected in series across the relay coil 86 to give the relay a slow release characteristic. These components also tend to suppress arcing in the switch 22.

The relay coil 86 is adapted to close a pair of normally open contacts 97. By means of leads 98 and 109, the contacts 97 are connected in series with the valve solenoid 76 between the power leads 91 and 96. Thus, energization of the relay 86 closes the contacts 97 and energizes the solenoid 76.

One side of the skid light 74 is connected to the power lead 96. A lead 102 is connected between the other side of the skid light and the lead 93 extending from the control switch 22. Thus, the skid light 74 will be energized whenever the control switch 22 is closed. The skid light 74 gives an indication in the pilot's cabin that the wheels of the vehicle are locked or in a skid, and that the foot pedal is momentarily not in control of the brake mechanism.

The test switch 75 is connected in parallel with the control switch 22 so that the pilot may simulate the action of the control switch 22 by closing the test switch 75. Before making a landing, the pilot may test the operability of the unit by closing the switch 75. This should cause the skid light 74 to become illuminated. If the skid light 74 fails to light, the pilot is warned that the antiskid system is not operating properly and that repairs should be made.

The operation of skid unit 9 will now be described. As the wheels 8 of the aircraft touch the runway upon landing, they will obtain what is known generally in the art as landing speed. The pilot will apply the brakes through the usual brake pedal in the pilot's cabin. Depending upon the length of the runway and other landing conditions, the application of braking power at the wheels may cause incipient skids depending upon how the braking power is applied by the pilot through the brake pedal. As the braking power is released and reapplied, the skidding will continue and sometimes develop into long skids in order for the pilot to bring his aircraft to a reduced speed consistent with proper landing conditions for the approach to and stop at the landing ramp. In either case, as soon as there is deceleration of shaft 5 in excess of that which is experienced for normal braking, dog 44 will slide counterclockwise along one of cam surfaces 49, thereby disengaging the indexing pin 48 with which it is in engagement at the moment. As a result, dog 44 is forced back into its chamber 46 and speed retention wheel 27 is disconnected from and overruns shaft 5. Speed retention wheel 27 will continue to rotate with magnet 37 rotating with it. Actuating magnet 55 is keyed, however, to shaft 5 and is capable of axial movement therealong. Deceleration of shaft 5 will cause, therefore, relative movement between magnets 37 and 55 and force their poles of the same polarity to move past each other. This not only releases instantly the holding force of poles of opposite polarity but permits coiled spring 61 to accelerate the separating action of poles of like polarity when thus meeting each other. Consequently, actuating magnet 55 will be rapidly moved away from magnet 37 and cause switch button 63 to operate snap switch 22.

When snap switch 22 is actuated, current will flow through the coil of time delay relay 86 and cause switch 97 to close. Immediately, current flows through the coil of the relay of the three-way valve 77 to actuate the valve 77 and cause the fluid to flow from the brake mechanism through the return line until the braking power at the wheels is released sufficiently to remove the skidding or the locking of the wheels. When the skidding is thus removed or the locked wheels are released, the speed of shaft 5 is restored. Dog 44 will then move again into engagement with one of the indexing pins 48 so as to again connect speed retention wheel 27 to be driven by shaft 5. This brings both magnet units 37 and 55 to the same rotating speed. Indexing pins 48 are spaced at predetermined locations with respect to the poles 38 and 39 and also to poles 56 and 57 so that when speed retention wheel 27 with magnet 37 is again locked to shaft 5, and magnets 37 and 53 are restored to the same speed of rotation, the negative poles 38 of magnet 37 will register or align with the positive poles 56 of magnet 55. The positive poles 39 of magnet 37 will, of course, align with the negative poles 57 of magnet 55. This produces an immediate attraction forcing actuating magnet 55 to move axially along shaft 5 toward magnet 37 to engage the same and to release snap switch 22.

Thus pins 48 serve as indexing elements to assure proper alignment of magnet 37 with magnet 55 when they are restored to the same speed of rotation upon elimination of skidding or wheel-locking. It will be observed here that for all practical purposes slippage between the units 37 and 55 is prevented so that the operation of the antiskid device 9 herein disclosed is quick and positive and reliable under all operating conditions.

Upon landing, the rotation of shaft 5 will cause dog 44 to engage one of the indexing pins 48, thereby effectively driving speed retention wheel 27. This causes both magnetic units to rotate at the same speed and a consequent alignment of poles of opposite polarity. Actuating magnet 55 will then move along shaft 5 to engage magnet 37 and disengage snap switch 22. Thereafter, the brake mechanism will be under the control of the foot pedal in the pilot's compartment and will so remain under this control until the airplane wheels go into a skid or are locked. Thus no mechanism is specifically required to keep the wheels of the airplane free of brake pressure until they reach normal speed upon landing.

The clearance between indexing magnet carrier 35 and sleeve 33 allows set screws 36 to provide an adjustment initially of the opposite poles 38 and 39 of magnet 37 with the opposite poles 56 and 57 of magnet 55. This alignment may therefore be easily kept through a proper adjustment of screws 36.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In a system for braking a wheel mounted in driving relationship with a shaft, a device responsive to skidding conditions of said wheel developed as the result of excessive braking for terminating braking action of said system automatically, and for restoring the said system to a braking condition automatically upon cessation of said skidding, said device comprising: a first magnetic member mounted upon, driven by, and axially movable along said shaft; an inertial mass mounted for rotation around said shaft, said mass including magnetic poles effectively disposed in mutually cooperative magnetic relationship with said first member; means coupled to said shaft and said mass for imparting and maintaining rotation of said mass and for establishing the angular position of said magnetic poles relative to said first member to produce mutual magnetic attraction between said member and said mass whenever the rate of rotation of said shaft tends to exceed the rate of rotation of said mass, whereby said first member is caused by said mutually attracting magnetic force to move along said shaft toward said mass, said means further functioning to de-couple said mass from said shaft when deceleration of said mass becomes lower than shaft deceleration, whereby said mass will rotate more rapidly than said first member and the latter member will move axially away from said mass as the result of the mutually repulsive magnetic force developed by repetitive passing of the magnetic poles of like polarity of said member and said mass caused by the rotational inertia of said mass; and means actuated in response to the movement of said first member away from said mass to develop a signal indicating the existence of a skidding condition of said wheel.

2. In a system for braking a wheel mounted in driving relationship with a shaft, a device responsive to skidding conditions of said wheel developed as the result of excessive braking for terminating braking action of said system automatically, and for restoring the said system to a braking condition automatically upon cessation of said skidding, said device comprising: a first magnetic member mounted upon, driven by, and axially movable along said shaft; an inertial mass mounted for rotation around said shaft, said mass including magnetic poles effectively disposed in mutually cooperative magnetic relationship with said first member; means coupled to said shaft and said mass for imparting and maintaining rotation of said mass and for establishing the angular position of said magnetic poles relative to said first member to produce mutual magnetic attraction between said member and said mass whenever the rate of rotation of said shaft tends to exceed the rate of rotation of said mass, whereby said first member is caused by said mutually attracting magnetic force to move along said shaft toward said mass, said means further functioning to de-couple said mass from said shaft when deceleration of said mass becomes lower than shaft deceleration exceeding a predetermined minimum, whereby said mass will rotate more rapidly than said first member and the latter member will move axially away from said mass as the result of the mutually repulsive magnetic force developed by repetitive passing of the magnetic poles of like polarity of said member and said mass caused by the rotational inertia of said mass; and means actuated in response to the movement of said first member away from said mass to develop a signal indicating the existence of a skidding condition of said wheel.

3. In a system for braking a wheel mounted in driving relationship with a shaft, a device responsive to skidding conditions of said wheel developed as the result of excessive braking for terminating braking action of said system automatically, and for restoring the said system to a braking condition automatically upon cessation of said skidding, said device comprising: a first magnetic member mounted upon, driven by, and axially movable along said shaft; an inertial mass mounted for rotation around said shaft, said mass including magnetic poles effectively disposed in mutually cooperative magnetic relationship with said first member; means coupled to said shaft and said mass for imparting and maintaining rotation of said mass and for establishing the angular position of said magnetic poles relative to said first member to produce mutual magnetic attraction between said member and said mass whenever the rate of rotation of said shaft tends to exceed the rate of rotation of said mass, whereby said first member is caused by said mutually attracting magnetic force to move along said shaft toward said mass, said means further functioning to de-couple said mass from said shaft when deceleration of said mass becomes lower than shaft deceleration, whereby said mass will rotate more rapidly than said first member and the latter member will move axially away from said mass as the result of the mutually repulsive magnetic force developed by repetitive passing of the magnetic poles of like polarity of said member and said mass caused by the rotational inertia of said mass; and a switch disposed in cooperative relationship with said first member whereby said switch will be actuated in responsive to movement of said first member away from said mass.

4. In a system for braking a wheel mounted in driving relationship with a shaft, a device responsive to skidding conditions of said wheel developed as the result of excessive braking for terminating braking action of said system automatically, and for restoring the said system to a braking condition automatically upon cessation of said skidding, said device comprising: a first magnetic member mounted upon, driven by, and axially movable along said shaft; an inertial mass mounted for rotation around said shaft, said mass including magnetic poles effectively disposed in mutually cooperative magnetic relationship with said first member; means coupled to said shaft and said mass for imparting and maintaining rotation of said mass and for establishing the angular position of said magnetic poles relative to said first member to produce mutual magnetic attraction between said member and said mass whenever the rate of rotation of said shaft tends to exceed the rate of rotation of said mass, whereby said first member is caused by said mutually attracting magnetic force to move along said shaft toward said mass, said means further functioning to de-couple said mass from said shaft when deceleration of said mass becomes lower than shaft deceleration exceeding a predetermined minimum, whereby said mass will rotate more rapidly than said first member and the latter member will move axially away from said mass as the result of the mutually repulsive magnetic force developed by repetitive passing of the magnetic poles of like polarity of said member and said mass by the rotational inertia of said mass; and a switch disposed in cooperative relationship with said first member whereby said switch will be actuated in response to movement of said first member away from said mass.

5. In a system for braking a wheel mounted in driving relationship with a shaft, a device responsive to skidding conditions of said wheel developed as the result of excessive braking for terminating braking action of said system automatically, and for restoring the said system to a braking condition automatically upon cessation of said skidding, said device comprising: a first magnetic member mounted upon, driven by, and axially movable along said shaft; an inertial mass mounted for rotation around said shaft, said mass including magnetic poles effectively disposed in mutually cooperative magnetic relationship with said first member; means coupled to said shaft and said mass for imparting and maintaining rotation of said mass and for establishing the angular position of said magnetic poles relative to said first member to produce mutual magnetic attraction between said member and said mass whenever the rate of rotation of said shaft tends to exceed the rate of rotation of said mass, whereby said first member is caused by said mutually attracting magnetic force to move along said shaft toward said mass, said means further functioning to de-couple said mass from said shaft when deceleration of said mass becomes lower than shaft deceleration exceeding a predetermined minimum, whereby said mass will rotate more rapidly than said first member and the latter member will move axially away from said mass as the result of the mutually repulsive magnetic force developed by repetitive passing of the magnetic poles of like polarity of said member and said mass caused by the rotational inertia of said mass; a resilient element disposed between said first member and said mass to increase the rapidity of separation of the former from the latter whenever said mass rotates more rapidly than said second member; and a switch disposed in cooperative relationship with said first member whereby said switch will be actuated in response to movement of said first member away from said mass.

6. In a system for braking a wheel mounted in driving relationship with a shaft, a device responsive to skidding conditions of said wheel developed as the result of excessive braking for terminating braking action of said system automatically, and for restoring the said system to a braking condition automatically upon cessation of said skidding, said device comprising: a first magnetic member mounted upon, driven by, and axially movable along said shaft; an inertial mass mounted for rotation around said shaft, said mass including magnetic poles effectively disposed in mutually cooperative magnetic relationship with said first member; a unidirectional escapement mechanism between said shaft and said mass, said mechanism including a carrier block fixedly coupled to said shaft, said block containing a radially oriented chamber having an opening generally perpendicular to the axis of said shaft, a plurality of cam surfaces in said inertial mass facing and sloping inwardly toward the periphery of said carrier block, a plurality of indexing pins, each of said pins effectively coupled to said mass and disposed at the outermost radial terminus of each cam surface, and a dog reciprocally mounted in said chamber such that said dog will slide inwardly repetitively toward said shaft along each successive cam surface whenever relative motion between said shaft and said mass occurs in one direction but said dog will engage one of said indexing pins whenever relative motion occurs between said shaft and said mass in the opposite direction, thereby bringing said shaft into driving relationship with said mass, a resilient element disposed between said first member and said mass to increase the rapidity of separation of the former from the latter whenever said mass rotates more rapidly than said second member; and a switch disposed in cooperative relationship with said first member whereby said switch will be actuated in response to movement of said first member away from said mass.

7. In a system for braking a wheel in driving relationship with a shaft, a device responsive to skidding conditions of said wheel developed as the result of excessive braking for terminating braking action of said system to a braking condition automatically upon cessation of said skidding, said device comprising: an internal mass; means coupled to said shaft and said mass for imparting and maintaining rotation of said mass when the rate of rotation of said shaft tends to exceed the rate of rotation of said mass, and for permitting the rate of rotation of said mass to decelerate at a rate lower than shaft deceleration exceeding a predetermined rate; a first magnetic member effectively coupled to said inertial mass; a second magnetic member keyed to be driven by said shaft and for axial movement toward said first member under the influence of magnetic attractive force whenever the said shaft is in driving and rate-maintaining relationship with said inertial mass, and for movement away from said first magnetic member under the influence of repulsive magnetic force whenever the rate of rotation of said mass exceeds the rate of rotation of said shaft; and means actuated in response to said movement for developing a signal indicating the existence of a skidding condition of said wheel and effective to deactuate said system until the skidding condition ceases.

8. A shaft deceleration detector, comprising a rotatable shaft, an inertia mass rotatable about the axis of said shaft, a one-way overrunning clutch connected between said shaft and said mass for driving said mass while enabling said mass to overrun said shaft, a first magnet secured to and rotatable with said mass, a second magnet adjacent said first magnet and mounted on said shaft for rotation therewith and sliding movement therealong, each of said magnets having a plurality of unlike poles facing the other magnet, and control means operable by movement of said second magnet along said shaft to produce a deceleration signal.

References Cited in the file of this patent
UNITED STATES PATENTS

| | | |
|---|---|---|
| 2,198,030 | Farmer | Apr. 23, 1940 |
| 2,294,605 | Newell | Sept. 1, 1942 |
| 2,381,225 | Newell | Aug. 7, 1945 |
| 2,415,344 | Eksergian | Feb. 4, 1947 |
| 2,631,696 | Yarber | Mar. 17, 1953 |